United States Patent [19]

Machida

[11] Patent Number: 5,764,937
[45] Date of Patent: Jun. 9, 1998

[54] DRIVE MECHANISM FOR COLLAPSING A LENS BARREL INTO THE BODY OF A CAMERA

[75] Inventor: Kiyosada Machida, Urawa, Japan

[73] Assignee: Nikon Corporation, Tokyo, Japan

[21] Appl. No.: 932,173

[22] Filed: Sep. 17, 1997

Related U.S. Application Data

[63] Continuation of Ser. No. 584,365, Jan. 11, 1996, abandoned.

[30] Foreign Application Priority Data

Feb. 8, 1995 [JP] Japan ................... 7-020728

[51] Int. Cl.$^6$ ................................ G03B 17/04
[52] U.S. Cl. ................ 396/349; 396/85; 396/144
[58] Field of Search .................... 396/85, 72, 83, 396/90, 131, 144, 349

[56] References Cited

U.S. PATENT DOCUMENTS

| | | | |
|---|---|---|---|
| 4,322,150 | 3/1982 | Kamata et al. | 354/195 |
| 4,974,949 | 12/1990 | Tanaka | 350/429 |
| 5,014,077 | 5/1991 | Yomogizawa et al. | 354/187 |
| 5,144,493 | 9/1992 | Nomura | 359/700 |
| 5,198,932 | 3/1993 | Takamura | 359/694 |
| 5,270,868 | 12/1993 | Nomura | 359/700 |
| 5,293,192 | 3/1994 | Akitake et al. | 354/219 |
| 5,515,129 | 5/1996 | Miyazawa et al. | 354/400 |

Primary Examiner—Safet Metjahic
Assistant Examiner—John Chizmar

[57] ABSTRACT

A drive mechanism for adjusting the spacing between first and second lens groups spaced apart from each other along the optical axis of a lens barrel of an optical device. The lens barrel is movable between a collapsed position inside the body of the optical device, a wide angle position and a telephoto angle position. The drive mechanism includes a member having a cam groove, and a guide member fit into the cam groove and connected to the second lens group for adjusting the spacing between the first and second lens groups. The guide member (a) moves in a first direction along the cam groove to adjust the spacing as the lens barrel is moved to the telephoto angle position, (b) moves in a second direction, opposite the first direction, along the cam groove to adjust the spacing as the lens barrel is moved from the telephoto angle position to the wide angle position, and (c) moves in the first direction along the cam groove to adjust the spacing as the lens barrel is moved from the wide angle position to the collapsed position.

15 Claims, 6 Drawing Sheets

DRIVE MECHANISM FOR COLLAPSING A LENS BARREL INTO THE BODY OF A CAMERA

This application is a continuation of application Ser. No. 08/584,365, filed Jan. 11, 1996, now abandoned.

BACKGROUND OF THE INVENTION

1. Field of the Invention

The present invention relates to a drive mechanism for compactly collapsing a zoom lens barrel into the body of a camera and, more particularly, to the operation of cam grooves, linear grooves and guide pins of a drive mechanism to compactly collapse the zoom lens barrel into the body of the camera.

2. Description of the Related Art

Conventionally, a camera can be equipped with a zoom lens which allows a photographer to "zoom" from a telephoto angle to a wide angle by adjusting the zoom lens. A lens barrel equipped with such a zoom lens typically includes two lens groups which can be advanced or withdrawn inside the lens barrel. The two lens groups are separated by a gap. The focal length of the lens barrel is adjusted by changing the gap between the two lens groups, thereby allowing telephoto angle or wide angle photography to be performed according to the desired magnification of a photographic image.

FIG. 1 illustrates a conventional zoom cam ring which is used to change the gap between a first lens group (not illustrated) and a second lens group (not illustrated). As illustrated in FIG. 1, a zoom cam ring 1 has multiple cam grooves 1a formed therein at the outer circumference of the zoom cam ring 1. Moreover, a linear guide cylinder (not illustrated) has linear grooves 2 formed therein. Linear grooves 2 are parallel to the optical axis of the lens barrel (not illustrated). Guide pins 3 are attached to a lens holder (not illustrated) which holds the second lens group. A respective guide pin 3 is fit into each linear groove 2. Then, when zoom cam ring 1 is rotated in the directions 100, cam grooves 1a, linear grooves 2 and guide pins 3 cooperate to move the second lens group in the optical axis direction. This movement of the second lens group allows the gap between the first lens group and the second lens group to be changed, thereby allowing telephoto angle or wide angle photography to be performed. Arrow H indicates the direction to the photographic subject (not illustrated).

A lens barrel typically has a wide angle position (representing the position of the lens barrel when wide angle photography is being performed), a telephoto angle position (representing the position of the lens barrel when telephoto angle photography is being performed), and a collapsed position (representing the position of the lens barrel when the lens barrel is retracted completely into the camera body (not illustrated)). When collapsing the lens barrel into the camera body, it is necessary to position the second lens group so that it closely approaches the first lens group. That is, the gap between the first lens group and the second lens group becomes very small. This close positioning of the first lens group to the second lens group is necessary for accommodating the lens barrel into the limited available area inside of the camera body.

Conventionally, to collapse the lens barrel into the camera body by closely positioning the first lens group and the second lens group, the zoom cam ring 1 in FIG. 1 includes collapsing cam grooves 1b extending from the cam grooves 1a. Collapsing cam grooves 1b allow the zoom cam ring 1 to be rotated to move the first lens group and the second lens group into the required positional relationship for collapsing the lens barrel into the camera body. For example, in FIG. 1, the position "T" of the guide pins 3 in the linear grooves 2 illustrates the positioning of guide pins 3 when the first lens group and the second lens group arranged for telephoto angle photography. The position "W" (see FIG. 1) of the guide pins 3 in the linear grooves 2 illustrates the positioning of guide pins 3 when the first lens group and the second lens group are arranged for wide angle photography. The position "R" (see FIG. 1) of the guide pins 3 in the collapsing cam grooves 1b illustrates the positioning of guide pins 3 when the first lens group and the second lens group are close together for collapsing the lens barrel into the camera body.

Unfortunately, the length of collapsing cam grooves 1b becomes large when the amount of collapse of the lens barrel is large. This large length of the collapsing cam grooves 1b causes the collapsing cam grooves to interfere with cam grooves 1a. For example, an interference portion 1c illustrates the interference between collapsing cam grooves 1b and cam grooves 1a. Such interference causes jamming and improper operation of the lens barrel.

To prevent such interference, camera designers have shortened the lens barrel in the optical axis direction, thereby making the pitch of the cam grooves 1a shorter. However, this type of approach will not allow a camera with a large lens barrel to completely collapse the lens barrel into the camera body. Moreover, the degree of tilt of the cam grooves 1a translates into drive load for a drive source (not illustrated) which drives the zoom cam ring 1. Shortening the pitch of the cam grooves 1a may not be appropriate for the drive load allowed by the drive source.

SUMMARY OF THE INVENTION

Accordingly, it is an object of the present invention to provide a camera having a zoom lens barrel which collapses into the camera body, and which eliminates the need for collapsing cam grooves in the zoom cam ring, thereby eliminating interference occurring in conventional cam rings.

Moreover, it is an object of the present invention to provide a camera equipped with a zoom lens barrel which is able to reduce the drive load, and to be more compact by eliminating the need for collapsing cam grooves.

It is a further object of the present invention to provide a camera equipped with a zoom lens barrel which prevents interference occurring in cam grooves on a zoom cam ring, even when the amount of collapse of the zoom lens barrel is relatively large.

Objects of the present invention are achieved by providing a drive mechanism for adjusting the spacing between first and second lens groups spaced apart from each other along the optical axis of a lens barrel of an optical device. The lens barrel is movable between a collapsed position inside the body of the optical device, a wide angle position and a telephoto angle position. The drive mechanism includes a member having a linear groove maintained parallel to the optical axis of the lens barrel, and a guide member fit into the linear groove and connected to the second lens group for adjusting the spacing between the first and second lens groups. The guide member (a) moves in a first direction along the linear groove to adjust the spacing as the lens barrel is moved to the telephoto angle position, (b) moves in a second direction, opposite the first direction, along the linear groove to adjust the spacing as the lens barrel is moved from the telephoto angle position to the wide angle position, and (c) moves in the first direction along the linear groove to adjust the spacing as the lens barrel is moved from the wide angle position to the collapsed position.

Moreover, objects of the present invention are achieved by providing the drive mechanism with a cam ring which rotates around the optical axis of the lens barrel and has a cam groove formed thereon. The guide member is fit into the cam groove. The rotation of the cam ring causes the linear groove, the cam groove and the guide member to cooperate together to adjust the spacing between the first and second lens groups by causing the guide member to move along the linear groove.

Objects of the present invention are also achieved by providing the drive mechanism with a first lens driving ring which is connected to the first lens group and rotates around the optical axis of the lens barrel to move the first lens group in the optical axis direction. The cam ring is connected to the first lens driving ring so that the cam ring rotates around the optical axis with the first lens driving ring when the lens barrel is in the telephoto angle position, the wide angle position, and between the telephoto angle position and the wide angle position. The cam ring is movable in the optical axis direction with respect to the first lens driving ring. A disconnection mechanism disconnects the cam ring from the first lens driving ring when the lens barrel is retracted from the wide angle position to the collapsed position so that the cam ring can rotate around the optical axis separately from the first lens driving ring when the lens barrel is in the collapsed position.

In addition, objects of the present invention are achieved by providing a drive mechanism which includes a member having (a) a linear groove maintained parallel to the optical axis of the lens barrel, (b) a cam ring which rotates around the optical axis of the lens barrel and has a cam groove formed thereon and (c) a guide member fit into the linear groove and the cam groove and connected to the second lens group. The rotation of the cam ring causes guide member to move along the linear groove to adjust the spacing between the first and second lens groups. Moreover, the cam ring (i) moves in a first direction along the optical axis as the lens barrel is moved from the wide angle position to the telephoto angle position, and (ii) moves in a second direction, opposite the first direction, and parallel to the optical axis as the lens barrel is moved from the wide angle position to the collapsed position.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 5A shows the cooperation of guide pins, guide grooves and cam grooves when the zoom lens barrel is in a collapsed position, according to an embodiment of the present invention.

FIG. 5B shows the cooperation of guide pins, guide grooves and cam grooves when the zoom lens barrel is in a wide angle position, according to an embodiment of the present invention.

FIG. 5C shows the cooperation of guide pins, guide grooves and cam grooves when the zoom lens barrel is in a telephoto angle position, according to an embodiment of the present invention.

DESCRIPTION OF THE PREFERRED EMBODIMENTS

Figure 1:
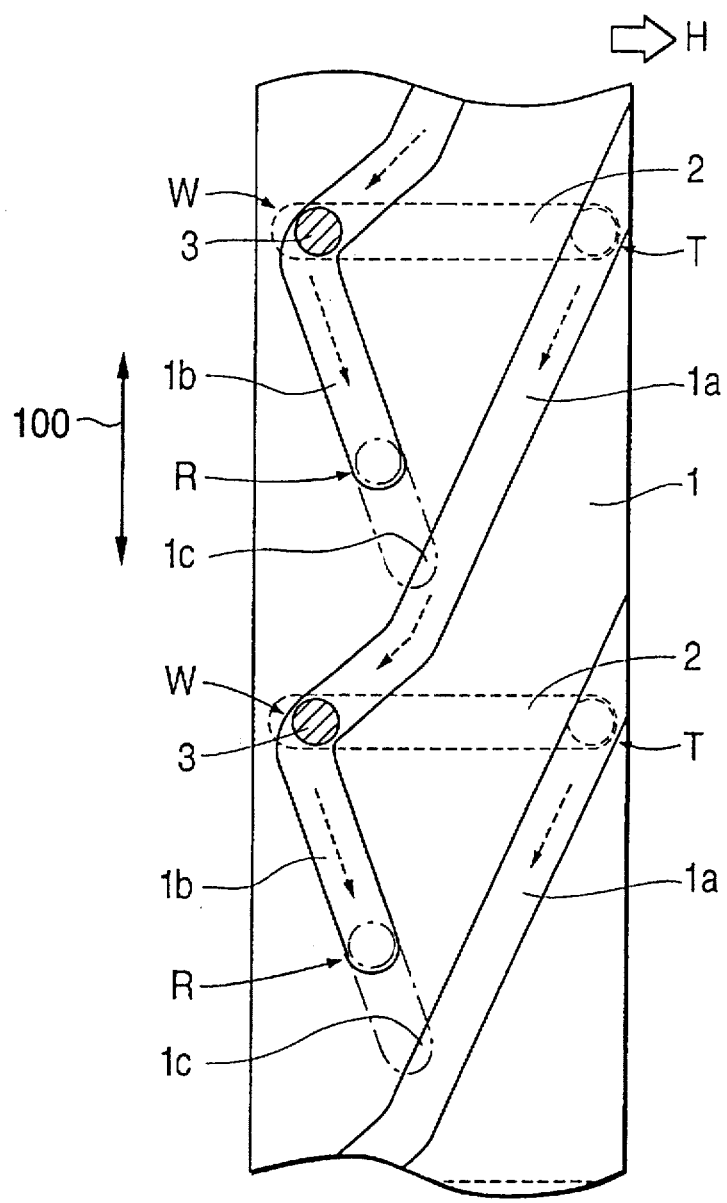
FIG. 1 (prior art) is a diagram illustrating a conventional zoom cam ring having collapsing cam grooves for a drive mechanism for adjustment of a zoom lens barrel of a camera.

Reference will now be made in detail to the present preferred embodiments of the present invention, examples of which are illustrated in the accompanying drawings, wherein like reference numerals refer to like elements throughout.

Figure 2:
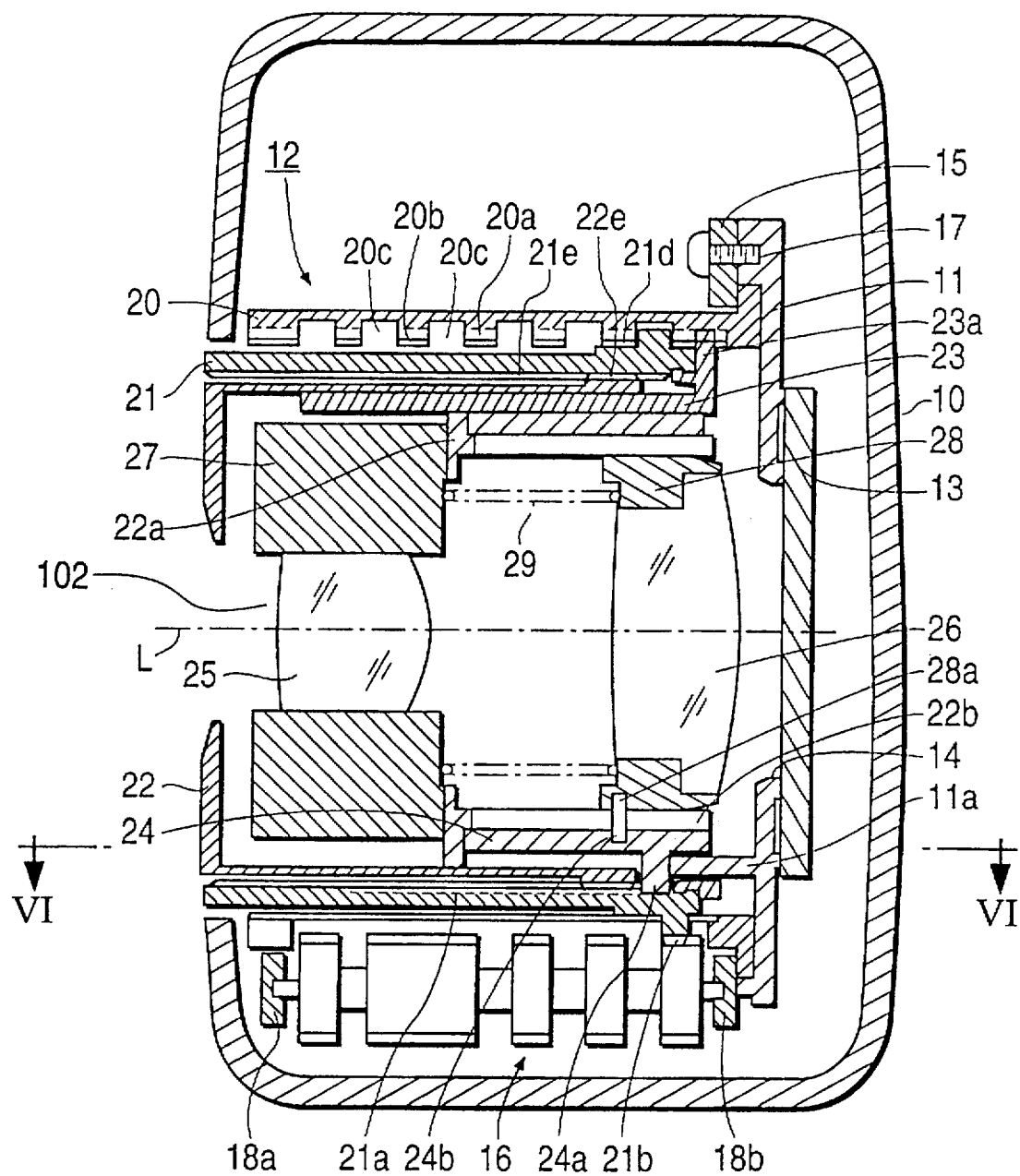
FIG. 2 is a diagram illustrating a cross-section of a camera equipped with a zoom lens barrel, wherein the zoom lens barrel is in a collapsed position, according to an embodiment of the present invention.
Figure 3:
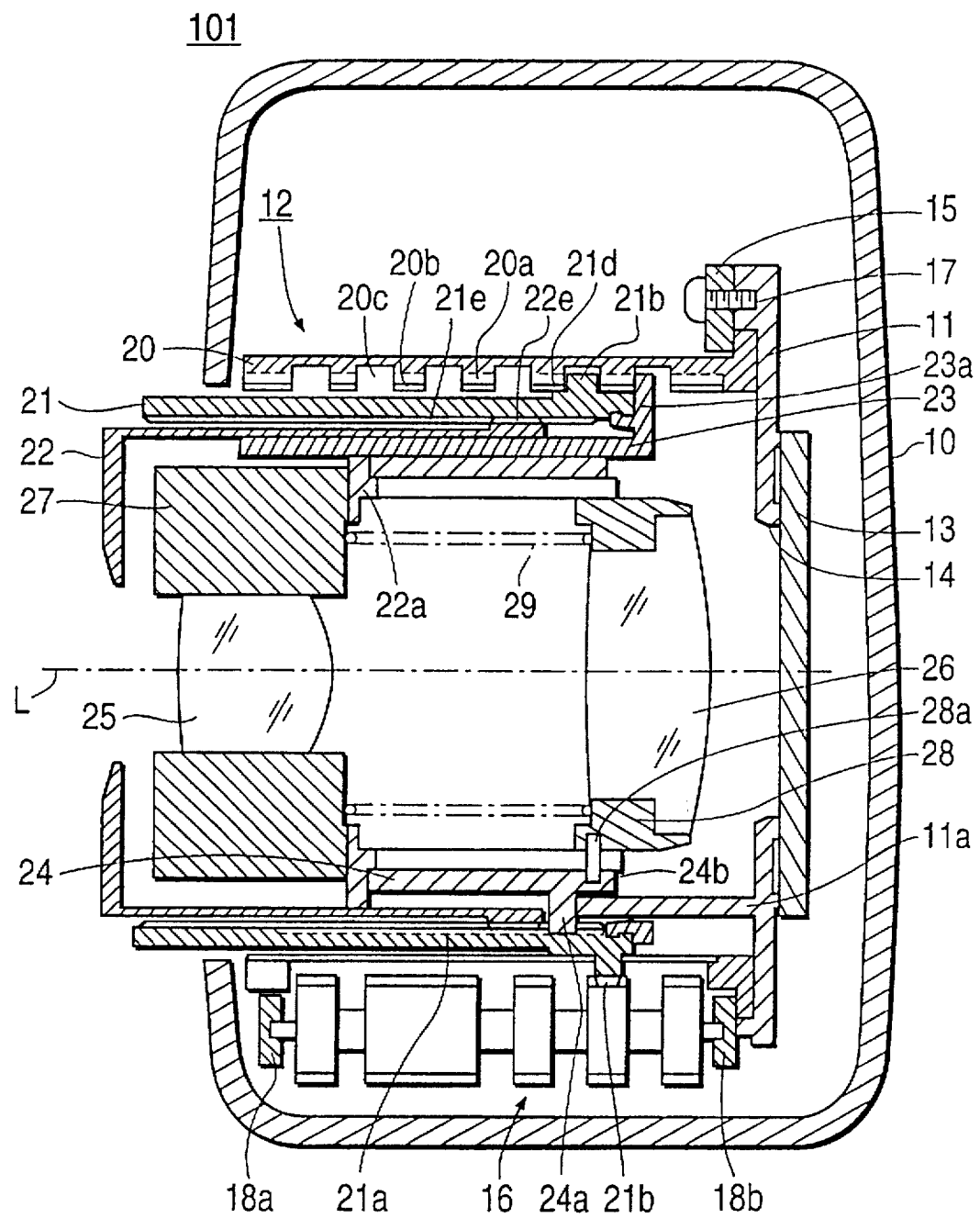
FIG. 3 is a diagram illustrating a cross-section of a camera equipped with a zoom lens barrel, wherein the zoom lens barrel is in a wide angle position, according to an embodiment of the present invention.
Figure 4:
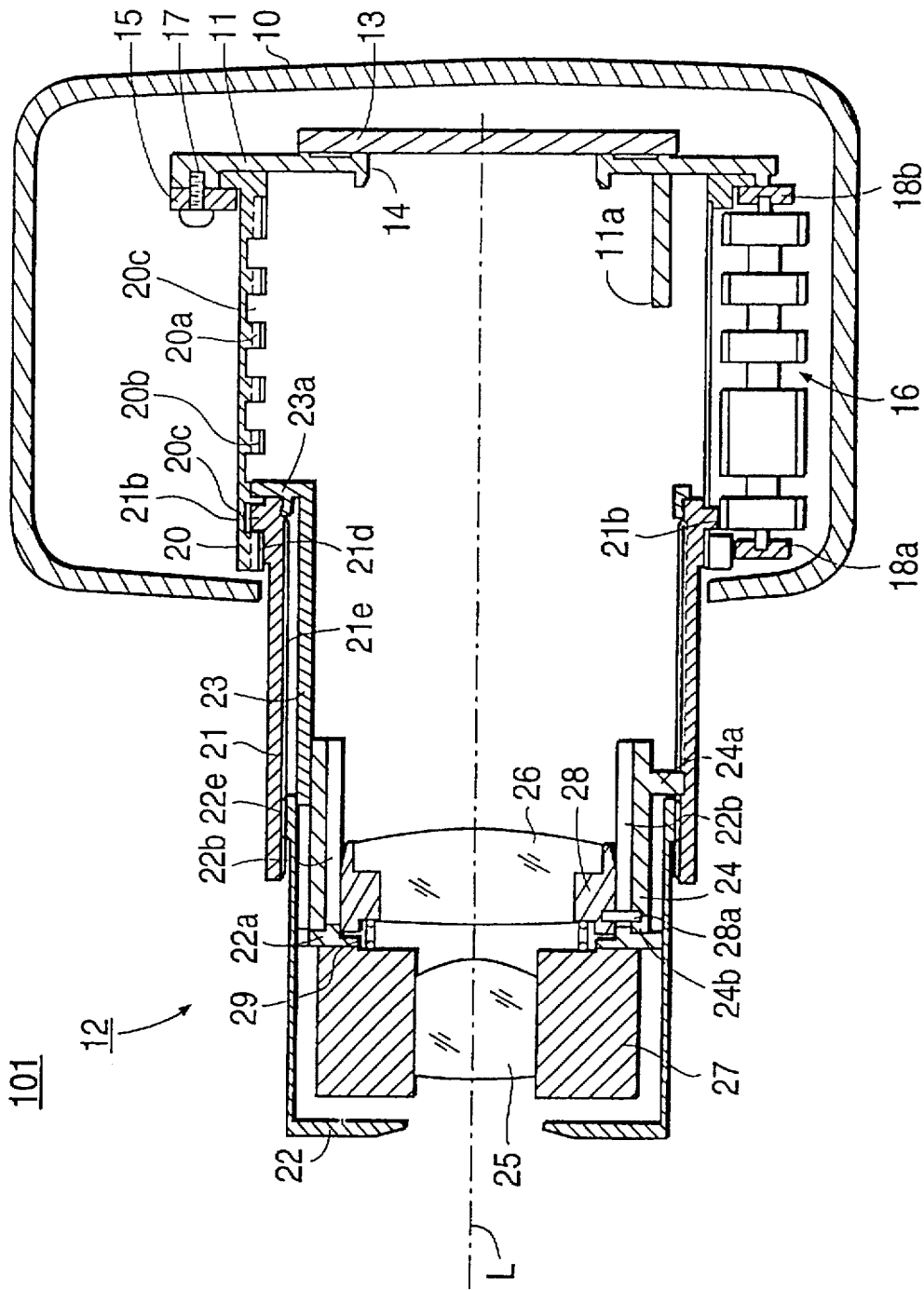
FIG. 4 is a diagram illustrating a cross-section of a camera equipped with a zoom lens barrel, wherein the zoom lens barrel is in a telephoto angle position, according to an embodiment of the present invention.

FIGS. 2–4 are diagrams illustrating a cross-section of a camera equipped with a zoom lens barrel, according to an embodiment of the present invention. More specifically, FIG. 2 illustrates a zoom lens barrel in a collapsed position, according to an embodiment of the present invention. FIG. 3 illustrates the zoom lens barrel in a wide angle position, according to an embodiment of the present invention. FIG. 4 illustrates the zoom lens barrel in a telephoto angle position, according to an embodiment of the present invention.

Referring now to FIGS. 2–4, a camera 101 includes a camera body 10 having an inner portion 11, and a zoom lens barrel 12. The camera body 10 has a protrusion 11a extending from the inner portion 11 of the camera body. The camera body 10 has a center opening 102 in the front surface of the camera body 10. By passing through the center opening 102, the zoom lens barrel 12 can be extended from the camera body 10 or retracted into the camera body 10. Therefore, the camera 101 is referred to as a "collapsible" camera.

The camera has an aperture 14 through which light passes to expose a recording medium (not illustrated), such as, for example, film. A pressure plate 13 is positioned at the rear surface of the aperture 14, and is formed at approximately a center position of the inner portion 11 of camera body 10. Pressure plate 13 forms a film path for the film to travel.

The zoom lens barrel 12 is equipped with a fixed cylinder 20. The fixed cylinder is secured as a unit to the front side of the inner portion 11 of the camera body 10, and is attached so that it protrudes in the optical axis direction L. A helicoid ring 21 is attached to, and inserted helicoidally into, the fixed cylinder 20. A barrel main unit 22 is inserted helicoidally into the inner circumference of the helicoid ring 21. A linear ring 23 is positioned on the film plane side of the helicoid ring 21 so that it is able to move in unison with the helicoid ring 21 in the optical axis direction and is able to rotate freely relative to the helicoid ring 21. A zoom cam ring 24 is arranged inside the barrel main unit 22 and rotates in conjunction with the rotation of the helicoid ring 21.

A first lens group 25 and a second lens group 26 comprise a photographic optical system forming a zoom lens. The first lens group 25 is supported by a lens rim 27, and the second lens group 26 is supported by a lens holder 28. The optical axis direction L represents the optical axis of the first lens group 25 and the second lens group 26. The first lens group 25 and the second lens group 26 are arranged inside the barrel main unit 22 so that the first lens group 25 and the second lens group 26 can move in the optical axis direction L. Lens shutter mechanisms (not illustrated) are incorporated into the lens rim 27 and the lens holder 28.

The fixed barrel 20 has a linear groove 20a which is parallel with the optical axis direction L. Further, the linear ring 23 has a protrusion 23a which fits into the linear groove 20a and functions to restrict the rotation of the linear ring 23.

The zoom lens cam ring 24 fits into the outer circumference of a guide 22a in the barrel main unit 22, so that zoom lens cam ring 24 rotates freely inside the barrel main unit 22. The zoom cam ring 24 rotates in conjunction with the rotation of the helicoid ring 21 via an outer circumference protrusion 24a of zoom cam ring 24 which fits into a linear groove 21a of the helicoid ring 21. Linear groove 21a is parallel to the optical axis direction L.

As illustrated in FIGS. 2–4, an inner circumference helicoid 20b meshes with an outer circumference helicoid 21d of the helicoid ring 21. Moreover, a spiral groove 20c is formed at the inner circumference of the fixed barrel 20 along with the inner circumference helicoid 20b. As illustrated in FIGS. 2 and 4, the spiral groove 20c prevents interference with a gear 21b attached at the outer circumference of the helicoid ring 21. The gear 21b moves in the optical axis direction L while rotating. An inner circumference helicoid 21e of the helicoid ring 21 meshes with an outer circumference helicoid 22e attached to the outer circumference of the main barrel unit 22.

A gear drive 16 meshes with the gear 21b and transmits driving force from a driving device (not illustrated), such as an electric motor, attached inside the camera body 10. Therefore, the gear drive 16 and the gear 21b together form a drive transmission section. A zooming operation is performed by advancing and withdrawing the first lens group 25 and the second lens group 26 (or, in the present embodiment, advancing and withdrawing only the second lens group 26) along the optical axis direction L. An extension operation or collapsing operation of the helicoid ring 21, the linear ring 23, the barrel main unit 22 and the zoom cam ring 24, which together form the lens barrel, is performed by the drive transmission section. According to the present embodiment of the present invention, a multi-gear configuration is used in which a drive gear is attached in parallel on the same axis. However, the preferred embodiment of the present invention is not intended to be limited to such a gear configuration. For example, gears with the same diameter dimensions may also be formed in the optical axis direction.

A holding member 15 holds down the back end flange of the fixed barrel 20 to the front surface of the inner portion 11 of the camera body 10. A screw 17 secures the holding member 15 to the inner portion 11 of the camera body 10. Support members 18a and 18b support both ends of the gear shaft of drive gear 16. Support members 18a and 18b are secured to the inner portion 11 of the camera body 10 by a securing mechanism (not illustrated).

As previously described, the lens holder 28 holds the second lens group 26. Multiple guide pins 28a protrude at the outer circumference of the back end of the lens holder 28 and are inserted through guide grooves 22b in the guide 22a of the barrel main unit 22. Guide grooves 22b are parallel with the optical axis direction L in the direction of circumference of the guide 22a of the barrel main unit 22, and regulate the motion stroke as they regulate the rotation of the second lens group 26.

A compression coil spring 29 is positioned between the lens holder 28 and the lens rim 27, and imparts energy to the second lens group 26 towards the film plane side (that is, the rear surface side of the camera body 10), thereby preventing wobbling.

Cam grooves 24b are formed circumferentially in the zoom cam ring 24. The cam grooves 24b are angled grooves which intersect the optical axis of the lens barrel at a specified angle. The cam grooves 24b are used to advance and withdraw the second lens group 26 along the guide grooves 22b via the guide 22a of the barrel main unit 22. The front ends of the guide pins 28a are inserted and fitted into the guide grooves 22b.

As previously described, FIG. 2 illustrates the zoom lens barrel 12 in a collapsed position, FIG. 3 illustrates the zoom lens barrel 12 in a wide angle position, and FIG. 4 illustrates the zoom lens barrel 12 in a telephoto angle position. As can be seen from FIG. 2, the zoom lens barrel 12 in the collapsed position is retracted into the camera body 10. As can be seen from FIG. 3, the zoom lens barrel 12 in the wide angle position is slightly extended beyond the camera body 10. Further, as can be seen from FIG. 4, the zoom lens barrel 12 in the telephoto angle position is fully-extended beyond the camera body 10.

Figure 5C:
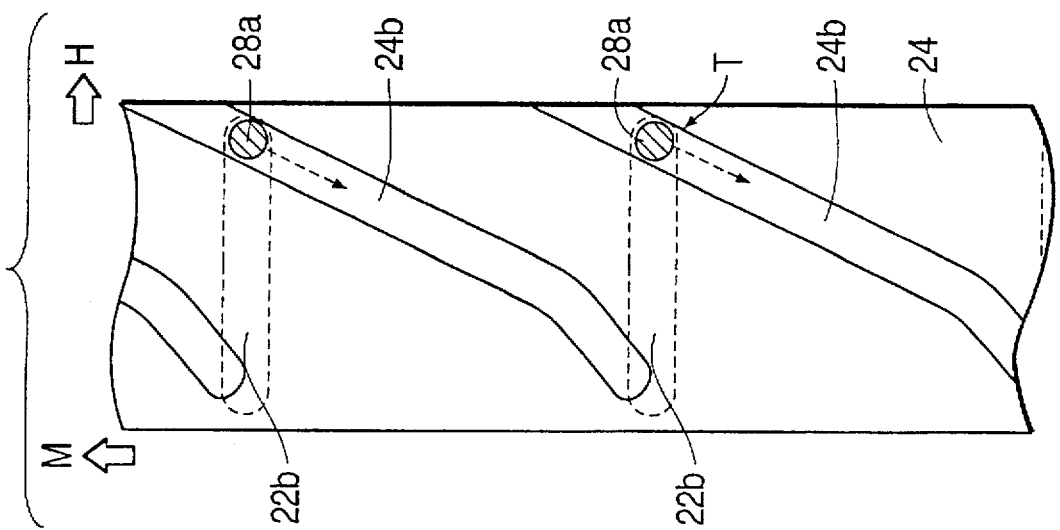
FIG. 5C is a diagram of a zoom cam ring according to an embodiment of the present invention. More specifically.
Figure 5B:
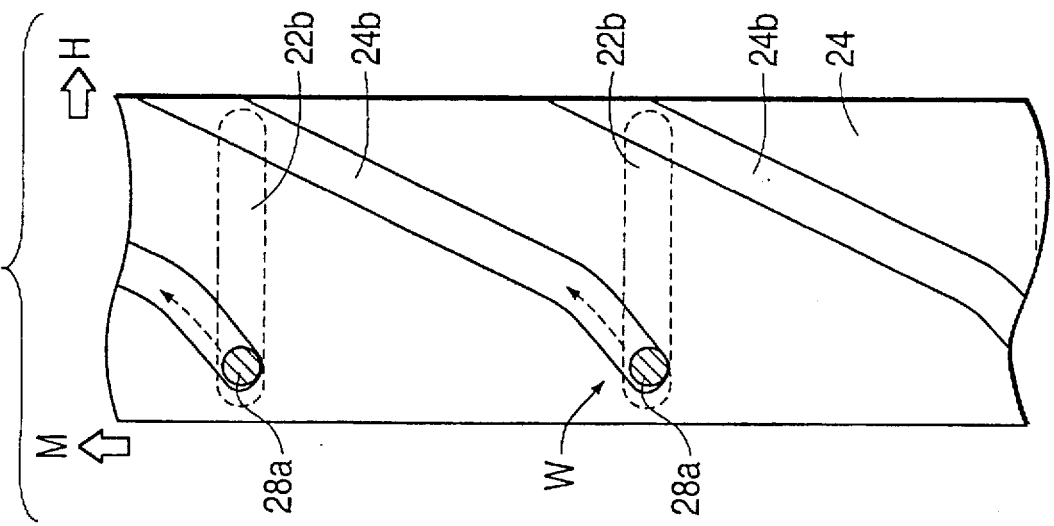
FIG. 5B is a diagram of a zoom cam ring according to an embodiment of the present invention. More specifically.
Figure 5A:
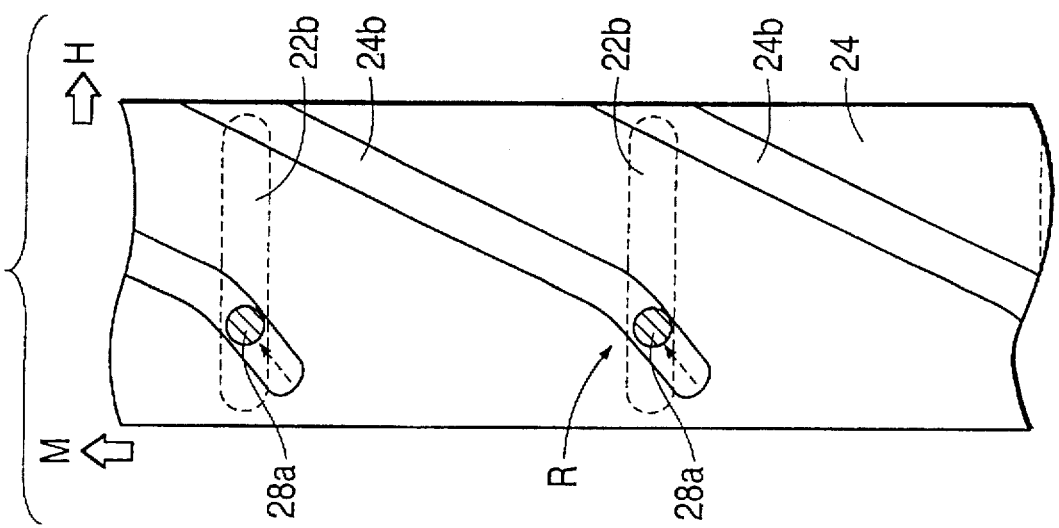
FIG. 5A is a diagram of a zoom cam ring according to an embodiment of the present invention. More specifically.

FIGS. 5A, 5B and 5C are diagrams of a zoom cam ring according to an embodiment of the present invention. More specifically, FIG. 5A shows the cooperation of guide pins, guide grooves and cam grooves when the zoom lens barrel is in a collapsed position, according to an embodiment of the present invention. FIG. 5B shows the cooperation of guide pins, guide grooves and cam grooves when the zoom lens barrel is in a wide angle position, according to an embodiment of the present invention. FIG. 5C shows the cooperation of guide pins, guide grooves and cam grooves when the zoom lens barrel is in a telephoto angle position, according to an embodiment of the present invention.

Thus, FIGS. 4 and 5C illustrate the configuration of the camera when the zoom lens barrel 12 is in the telephoto angle position. As illustrated by FIG. 5C, when the zoom lens barrel 12 is in the telephoto angle position, the guide pins 28a are positioned at the telephoto angle position "T" on the photographic subject side of the guide grooves 22b, where the arrow H indicated the direction to the photographic subject. From the position of the lens barrel as illustrated in FIGS. 4 and 5C, the zoom cam ring 24, which rotates in conjunction with the helicoid ring 21, can be rotated by a driving mechanism (not illustrated) in the direction of the arrow M to retract the zoom lens barrel 12 into the camera body 10. This rotation of the zoom cam ring 24 causes the cam grooves 24b to move in an upwards direction (that is, in the direction of the arrow M). As a result, the guide pins 28a are pressed by the groove walls of the cam groves 24b. This pressing force causes the guide pins 28a to move along the guide grooves 22b in the direction of the film plane (that is, a direction opposite to the arrow H).

Such movement of the helicoid ring 21 and the zoom cam ring 24 causes the guide pins 28a to move from the telephoto angle position "T" (as illustrated by FIGS. 4 and 5C) to the wide angle position "W" on the film plane side of the guide grooves 22b, as illustrated in FIG. 5B. This movement of the guide pins 28a to the wide angle position "W" causes the zoom lens barrel 12 to retract from the telephoto angle position illustrated in FIG. 4 to the wide angle position illustrated in FIG. 3.

From the position of the lens barrel as illustrated in FIGS. 3 and 5B, the zoom cam ring 24 can be rotated in the direction of the arrow M to further retract the zoom lens barrel 12 into a collapsed position inside the camera body 10. This rotation of the zoom cam ring 24 causes the cam grooves 24b to move in an upwards direction (that is, in the direction of the arrow M) to cause the guide pins 28a to move along the guide grooves 22b in the direction of the photographic subject (that is, the direction of the arrow H).

Such movement of the zoom cam ring 24 causes the guide pins 28a to move from the wide angle position "W" (as illustrated by FIGS. 3 and 5B) to the collapsed position "R," as illustrated in FIG. 5A. This movement of the guide pins 28a to the collapsed position "R" causes the zoom lens barrel 12 to further retract from the wide angle position illustrated in FIG. 3 to the collapsed position illustrated in FIG. 2.

As can be seen from FIGS. 5A, 5B and 5C, when the zoom lens barrel 12 is retracted into the camera body 10 from the wide angle position, the guide pins 28a move from the wide angle position "W" to the collapsed position "R" by moving towards the photograph subject (that is, in the direction of the arrow H), without requiring the use of collapsing cam grooves. This operation can be compared to a conventional camera in which, as illustrated in FIG. 1, collapsing cam grooves 1b are necessary to move the guide pins 28a from the wide angle position "W" to the collapsed position "R". Thus, the present invention does not have the undesirable interference portion 1c (see FIG. 1) of a conventional camera.

More specifically, according to the present embodiments of the present invention, when the guide pins 28a are in either the telephoto angle position "T" illustrated in FIG. 5C or the wide angle position "W" illustrated in FIG. 5B, the protrusion 24a of the zoom cam ring 24 fits into the linear groove 21a of the helicoid ring 21. As a result, when the zoom cam ring 24 is zooming down (that is, the zoom lens barrel 12 is zooming from the telephoto angle position to the wide angle position), the zoom cam ring 24 rotates along with the helicoid ring 21 to cause the guide pins 28a to move along the guide grooves 22b toward the film plane side. This movement of the guide pins 28a causes the second lens group 26 to move toward the film plane side.

Figure 6A:
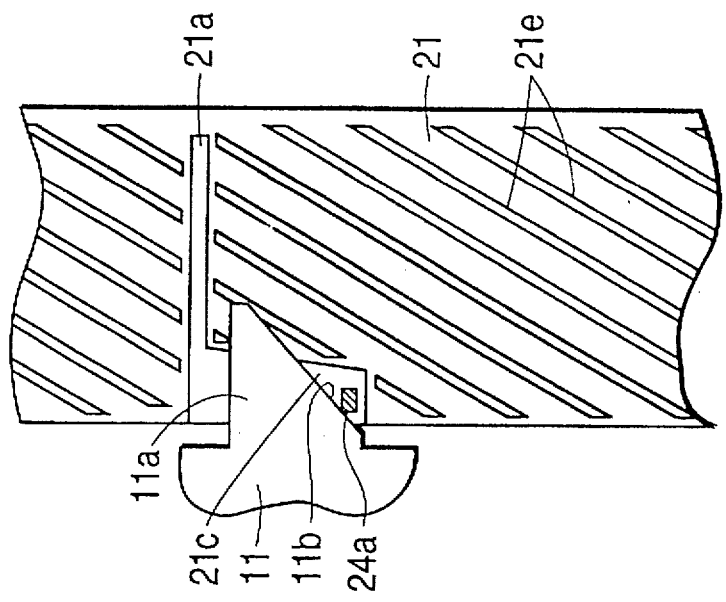
FIG. 6A is a diagram illustrating a view from the direction along lines VI—VI in FIG. 2, illustrating the relationship between a protrusion of a zoom cam ring and a protrusion of the camera body when the lens barrel is in a wide angle position and begins retraction to a collapsed position (without showing other elements which would be seen in a cross-sectional view along lines VI—VI in FIG. 2), according to embodiments of the present invention.

FIG. 6A is a diagram illustrating a view from the direction along lines VI—VI in FIG. 2, illustrating the relationship between the protrusion 24a of the zoom cam ring 24 and the protrusion 11a of the inner portion 11 of camera body 10 when the zoom lens barrel 12 is in the wide angle position and begins a further retraction to the collapsed position, according to embodiments of the present invention.

Figure 6B:
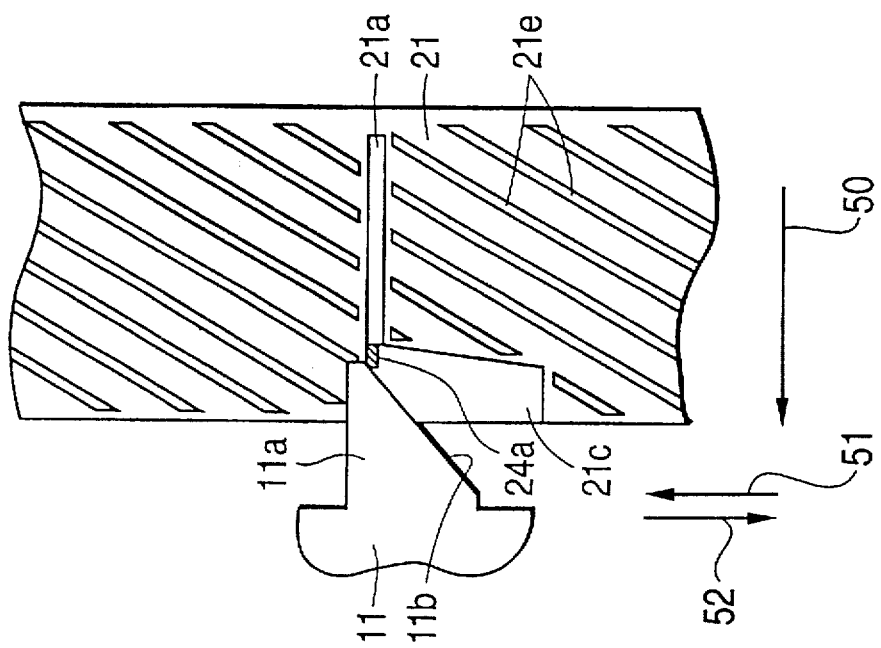
FIG. 6B is a diagram illustrating a view from the direction along lines VI—VI in FIG. 2, illustrating the relationship between a protrusion of a zoom cam ring and a protrusion of the camera body when the lens barrel is in a collapsed position (without showing other elements which would be seen in a cross-sectional view along lines VI—VI in FIG. 2), according to embodiments of the present invention.

Similarly, FIG. 6B is a diagram illustrating a view from the direction along lines VI—VI in FIG. 2, illustrating the relationship between the protrusion 24a of the zoom cam ring 24 and the protrusion 11a of the inner portion 11 of camera body 10 when the zoom lens barrel 12 is in the collapsed position, according to embodiments of the present invention. FIGS. 6A and 6B are not true cross-sectional views along lines VI—VI in FIG. 2, but only show the relationship of various elements if such elements could be clearly seen from the direction VI—VI in FIG. 2. Thus, FIG. 6A does not show other elements which would be seen in a true cross-sectional view along lines VI—VI in FIG. 2.

Referring now to FIG. 6A, when the zoom lens barrel 12 begins retracting from the wide angle position to the collapsed position, the protrusion 24a of the zoom cam ring 24 strikes a slanted surface 11b of the protrusion 11a of the inner portion 11 of camera body 10. At this time, the protrusion 24a moves to a position corresponding to a roll off 21c of the linear groove 21a in the helicoid ring 21. As a result, the zoom cam ring 24 is not restricted to the rotation of the helicoid ring 21. Therefore, as the barrel main unit 22, the helicoid ring 21 and the zoom cam ring 24 move toward the film plane side, the protrusion 24a moves along the slanted surface 11b of the protrusion 11a of the inner portion 11 of camera body 10. This movement of the protrusion 24a along the slanted surface 11b results in the collapsed condition illustrated in FIG. 6B. Thus, when the zoom lens barrel 12 moves from the wide angle position to the collapsed position, the zoom cam ring 24 moves in a direction opposite to the direction in which the zoom cam ring 24 moves when the zoom lens barrel moves from the wide angle position to the telephoto angle position. As illustrated in FIG. 5A, this movement of the zoom cam ring 24 causes the guide pins 28a to actually move from the wide angle position W towards the telephoto angle position T in the direction of the photographic subject, to eventually reach the collapsed position R with the zoom lens barrel 12 retracting into the camera body 10 in the collapsed position as illustrated in FIG. 2. Therefore, the guide pins 28a can be described as using the telephoto angle side of the cam grooves 24a as collapsing cam grooves.

In contrast, when the barrel main unit 22 is extended, the above-described operation is reversed. More specifically, movement of the zoom lens barrel 12 from the collapsed position illustrated in FIG. 2 to the wide angle position illustrated in FIG. 3 is achieved by imparting energy in the film plane direction to the second lens group 26 and the lens holder 28 via the energy of the compression coil spring 29. This imparted energy causes the guide pins 28a of the lens holder 28 to attempt to move the cam grooves 24b in the upward direction (see arrow M) in FIG. 5A. As a result, the guide pins 28a are pressed by the groove walls of the cam grooves 24b to thereby cause the protrusion 24a of the zoom cam ring 24 to press against the slanted surface 11b of the protrusion 11a of the inner portion 11 of camera body 10.

Moreover, when the extension of the zoom lens barrel 12 continues past the wide angle position, the protrusion 24a is moved from the slanted surface 11b of the protrusion 11a to the linear groove 21a, thereby resulting in the telephoto angle position illustrated in FIGS. 4 and 5C.

The embodiments of the present invention can be further understood by referring to arrows 50, 51 and 52 illustrated in FIG. 6A. When helicoid ring 21 starts moving in the direction of arrow 50, helicoid ring 21 also advances in the direction of arrow 51 at the same time. The barrel main unit 22 (not illustrated in FIGS. 6A and 6B) moves in the direction of arrow 50 due to the movement of helicoid ring 21 in the direction of arrow 51. The protrusion 24a integrally moves with the barrel main unit 22 with respect to the direction of the optical axis. Consequently, when the barrel main unit 22 advances in the direction of arrow 50, the protrusion 24a moves in the direction of arrow 50, thereby disengaging the linear groove 21a from the protrusion 24a, as shown in FIG. 6A.

When the helicoid ring 21 moves further in the direction of arrow 51, the protrusion 24a moves further in the direction of arrow 50. Subsequently, the protrusion 24a contacts the slanted surface 11b and slides in the direction of arrow 52, to the position shown in FIG. 6B. Thus, the protrusion 24a moves in the direction of arrow 52, which is opposite movement of the helicoid ring 21 in the direction of arrow 51. Then, the zoom cam ring 24 reverses rotation in the direction of arrow 52. The roll off 21c is a groove to release the protrusion 24a from the helicoid ring 21.

As a result of the above-described operation according to the present embodiments of the present invention, it is not necessary to use the undesirable collapsing cam grooves 1b illustrated in FIG. 1. More specifically, by driving the zoom cam ring 24 in a rotation direction which is the same as the drive direction when moving from the telephoto angle position to the wide angle position, the second lens group 26 can be brought as close as possible to the first lens group 25 and the barrel main unit 22 of the zoom lens barrel 12 can be collapsed inside the camera body 10. According to the above embodiments of the present invention, such operation is achieved without using the coil shaped collapsing cam grooves of a conventional camera.

According to the above embodiments of the present invention, the degree of freedom when forming the cam grooves 24b in the zoom cam ring 24 is increased compared with a conventional camera. In addition, according to the above embodiments of the present invention, the incline angle along the optical axis direction can be made more gradual, compared to a conventional camera, thereby reducing the drive load need to rotate the zoom cam ring 24. As a result, according to the above embodiments of the present invention, a drive source for driving the cam zoom ring 24 can be made more compact, thereby contributing to the overall compactness of the camera.

According to the above embodiments of the present invention, a zoom lens barrel 12 includes a first lens group 25 and a second lens group 26. The zoom lens barrel 12 can be extended from, or retracted into, the camera body 10. A lens holder 28 supports the second lens group 26. A cam mechanism which includes, for example, guide pins 28a, guide grooves 22b and cam grooves 24b, changes the gap between the first lens group 25 and the second lens group 26. The cam mechanism is attached to the lens barrel main unit 22, which supports the first lens group 25. A drive mechanism (for example, protrusion 11a and slanted surface 11b) drives the cam mechanism in a direction opposite the drive direction during zooming when the zoom lens barrel 12 is collapsed.

A camera having a zoom lens barrel according to the above embodiments of the present invention has several advantages over a conventional camera having a zoom lens barrel. First, the preferred embodiments of the present invention do not require conventional collapsing cam grooves. Thus, by eliminating collapsing cam grooves, the preferred embodiments of the present invention prevent the problem of interference among cam grooves, makes it possible to reduce the cam groove pitch, allows for a reduction in the diameter of the lens barrel main unit, and allows the camera to be made more compact. Second, even if the diameter of the lens barrel main unit is the same as with a conventional camera, the preferred embodiments of the present invention allow the cam grooves to be made more gradual to the extent that there are not collapsing end side portions of the cam grooves. As a result, in extending, retracting or collapsing the zoom lens barrel, the rotation drive load can be reduced. Therefore, a compact drive motor with a relatively small driving force can be used.

According to the above embodiments of the present invention, the helicoid ring 21 is used as a drive ring to advance and withdraw, in the optical axis direction, the lens rim 27 supporting first lens group 25. A drive cam mechanism comprising, for example, guide pins 28a, cam grooves 24b and guide grooves 22b, advances and withdraws a lens holder 28 supporting a second lens group 26. The drive cam mechanism rotates around the optical axis by the helicoid ring 21, since the helicoid ring 21 is inserted into the lens rim 27. Therefore, the drive cam mechanism rotates freely around the optical axis, in the optical axis direction relative to the lens rim 27. The drive cam mechanism is able to rotate freely in unison with the helicoid ring 21 and is able to move relative to the helicoid ring 21 in the optical axis direction. However, the drive cam mechanism is able to rotate separately from the helicoid ring 21 when the zoom lens barrel 21 is collapsed, and rotates in a direction which is different from the helicoid ring 21 rotation direction via a fitting mechanism attached to the camera body.

According to the above embodiments of the present invention, a zoom cam ring advances and withdraws a first lens group and a second lens group inside a zoom lens barrel. A cam mechanism, that is, a cam groove section, of the zoom cam ring is also used. The zoom lens barrel is collapsed by moving guide pins which fit into the cam grooves in a reverse direction relative to the rotation during zooming drive.

According to the above embodiments of the present invention, a drive mechanism adjusts the spacing between first and second lens groups (for example, lens groups 25 and 26) spaced apart from each other along the optical axis of a lens barrel (for example, zoom lens barrel 12) of an optical device. The lens barrel is movable between a collapsed position inside the body of the optical device, a wide angle position and a telephoto angle position. The drive mechanism includes a member (for example, barrel main unit 22) having a linear groove (for example, guide groove 22b) maintained parallel to the optical axis of the lens barrel, and a guide member (for example, guide pin 28a) fit into the linear groove and connected to the second lens group for adjusting the spacing between the first and second lens groups. The guide member (a) moves in a first direction along the linear groove to adjust the spacing as the lens barrel is moved to the telephoto angle position, (b) moves in a second direction, opposite the first direction, along the linear groove to adjust the spacing as the lens barrel is moved from the telephoto angle position to the wide angle position, and (c) moves in the first direction along the linear groove to adjust the spacing as the lens barrel is moved from the wide angle position to the collapsed position, as illustrated, for example, in FIGS. 5A, 5B and 5C.

Moreover, according to the above embodiments of the present invention, the drive mechanism can include a cam ring (for example, cam ring 24) which rotates around the optical axis of the lens barrel and has a cam groove (for example, cam groove 24b) formed thereon. The guide member is fit into the cam groove. The rotation of the cam ring causes the linear groove, the cam groove and the guide member to cooperate together to adjust the spacing between the first and second lens groups by causing the guide member to move along the linear groove. See, for example, FIGS. 5A, 5B and 5C.

Further, according to the above embodiments of the present invention, the drive mechanism can include a first lens driving ring (for example, helicoid ring 21) which is connected to the first lens group and rotates around the optical axis of the lens barrel to move the first lens group in the optical axis direction. The cam ring is connected to the first lens driving ring so that the cam ring rotates around the optical axis with the first lens driving ring when the lens barrel is in the telephoto angle position, the wide angle position, and between the telephoto angle position and the wide angle position. The cam ring is movable in the optical axis direction with respect to the first lens driving ring. A disconnection mechanism (for example, the combined operation of the linear groove 21a in helicoid ring 21, the protrusion 11a having the slanted surface 11b, the protrusion 24a and the roll off 21c, as illustrated in FIGS. 6A and 6B) disconnects the cam ring from the first lens driving ring when the lens barrel is retracted from the wide angle position to the collapsed position so that the cam ring can rotate around the optical axis separately from the first lens driving ring when the lens barrel is in the collapsed position, as illustrated, for example, in FIGS. 6A and 6B.

In addition, according to the above embodiments of the present invention, a drive mechanism includes a member having (a) a linear groove (for example, guide groove 22b in barrel main unit 22) maintained parallel to the optical axis of the lens barrel, (b) a cam ring (for example, cam ring 24) which rotates around the optical axis of the lens barrel and has a cam groove (for example, cam groove 24b) formed thereon and (c) a guide member (for example, guide pin 28a) fit into the linear groove and the cam groove and connected to the second lens group. The rotation of the cam ring causes the guide member to move along the linear groove to adjust the spacing between the first and second lens groups. Moreover, as illustrated in FIGS. 6A and 6B, the cam ring moves in a first direction (that is, towards the photographic subject) along the optical axis as the lens barrel is moved from the wide angle position to the telephoto angle position. That is, the protrusion 24a moves along linear groove 21a towards the photographic subject when zooming. Further, the cam ring moves in a second direction, opposite the first direction, as the lens barrel is moved from the wide angle position to the collapsed position. That is, as illustrated in FIG. 6B, the protrusion 24a moves "down and to the left" when moving to the collapsed position. This movement in the direction "to the left" in FIG. 6B can be described as in a second direction, opposite to the direction.

In the above embodiments of the present invention, the first lens group was described and illustrated as being a lens group closer to the photographic subject, and the second lens group was described and illustrated as being a lens group closer to the film. However, the preferred embodiments of the present invention are not intended to be limited in this manner. For example, the second lens group can be the lens group closer to the photographic subject. In addition, the preferred embodiments of the present invention are not intended to be limited to two lens groups, and virtually any number of lens groups can be used in the lens barrel.

In the above embodiments of the present invention, the guide groove 22b is described and illustrated as a linear groove which is maintained parallel to the optical axis of the lens barrel. However, the guide groove is not intended to be limited to a "linear" groove, and can be of a different shape. Moreover, the guide groove does not have to be necessarily maintained to be parallel to the optical axis of the lens barrel.

Although a zoom lens barrel has been disclosed and described herein, the embodiments of the present invention are not intended to be limited to a zoom lens barrel. Instead, the embodiments of the present invention are applicable to virtually any type of lens barrel. Moreover, the term "lens barrel" is not intended to be limited to a "barrel" shape, and can be applied to virtually any shaped structure which holds a lens.

Further, the embodiments of the present invention are not intended to be limited to the specific structure disclosed herein, and obvious modifications can be made thereto. For example, the structure and shape of various elements, including the zoom lens barrel, of a collapsible camera can easily be modified.

The preferred embodiment of the present invention is described as relating to a camera which used "film." However, the present invention is not intended to be limited to a camera which uses "film," and can be used in a camera or optical device which uses an other type of recording medium, such as an optical disk or magnetic recording medium.

The present invention is described as relating to a camera. However, the present invention is not intended to be limited to a camera. For example, the present invention can be used in other types of optical devices including, but not limited to, camcorders, motion picture cameras, telescopes, binoculars, microscopes, range finding equipment, lasers, fiber optic communication systems, and various optical projection system.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A drive mechanism for adjusting the spacing between first and second lens groups spaced apart from each other along the optical axis of a lens barrel of an optical device, the lens barrel being movable between a collapsed position inside the body of the optical device, a wide angle position and a telephoto angle position, the drive mechanism comprising:

a member having a cam groove; and a guide member fit into the cam groove and connected to the second lens group for adjusting the spacing between the first and second lens groups, wherein the guide member moves in a first direction along the cam groove to adjust the spacing as the lens barrel is moved to the telephoto angle position, moves in a second direction, opposite the first direction, along the cam groove to adjust the spacing as the lens barrel is moved from the telephoto angle position to the wide angle position, and moves in the first direction along the cam groove to adjust the spacing as the lens barrel is moved from the wide angle position to the collapsed position.

2. A drive mechanism as in claim 1, further comprising:

a cam ring which rotates around the optical axis of the lens barrel and has a cam groove formed thereon, wherein the guide member is fit into the cam groove of the cam ring and the rotation of the cam ring causes the cam groove of the member, the cam groove of the cam ring and the guide member to cooperate together to adjust the spacing between the first and second lens groups by causing the guide member to move along the cam groove of the member.

3. A drive mechanism as in claim 1, wherein the lens barrel is directed to a subject, and the first direction is the direction to the subject.

4. A drive mechanism as in claim 2, further comprising:

a first lens driving ring which is connected to the first lens group and rotates around the optical axis of the lens barrel to move the first lens group in the optical axis direction, the cam ring being connected to the first lens driving ring so that the cam ring rotates around the optical axis with the first lens driving ring when the lens barrel is in the telephoto angle position, the wide angle position, and between the telephoto angle position and the wide angle position, and the cam ring being movable in the optical axis direction with respect to the first lens driving ring; and a disconnection mechanism for disconnecting the cam ring from the first lens driving ring when the lens barrel is retracted from the wide angle position to the collapsed position so that the cam ring can rotate around the optical axis separately from the first lens driving ring when the lens barrel is in the collapsed position.

5. A drive mechanism as in claim 4, wherein:

the cam ring has a protrusion thereon which moves with the cam ring as the cam ring moves along the optical axis, and the disconnection mechanism comprises a protrusion having a slanted surface, wherein the disconnection mechanism disconnects the cam ring from the first lens driving ring by causing the protrusion of the cam ring to interact with the slanted surface of the protrusion of the disconnection mechanism, to change the direction of movement of the protrusion of the cam ring and thereby change the direction of movement of the cam ring.

6. A drive mechanism as in claim 1, wherein the optical device is a camera.

7. A drive mechanism as in claim 4, wherein the optical device is a camera.

8. An optical device, comprising:

a body;

a lens barrel including first and second lens groups therein and spaced apart from each other along the optical axis of the lens barrel, the lens barrel being movable between a collapsed position inside the body, a wide angle position and a telephoto angle position; and a drive mechanism for adjusting the spacing between the first and second lens groups of the lens barrel, the drive mechanism comprising a member having a cam groove, and a guide member fit into the cam groove and connected to the second lens group for adjusting the spacing between the first and second lens groups, wherein the guide member moves in a first direction along the cam groove to adjust the spacing as the lens barrel is moved to the telephoto angle position, moves in a second direction, opposite the first direction, along the cam groove to adjust the spacing as the lens barrel is moved from the telephoto angle position to the wide angle position, and moves in the first direction along the cam groove to adjust the spacing as the lens barrel is moved from the wide angle position to the collapsed position.

9. An optical device as in claim 8, further comprising:

a cam ring which rotates around the optical axis of the lens barrel and has a cam groove formed thereon, wherein the guide member is fit into the cam groove of the cam ring and the rotation of the cam ring causes the cam groove of the member, the cam groove of the cam ring and the guide member to cooperate together to adjust the spacing between the first and second lens groups by causing the guide member to move along the cam groove of the member.

10. An optical device as in claim 9, further comprising:

a first lens driving ring which is connected to the first lens group and rotates around the optical axis of the lens barrel to move the first lens group in the optical axis direction, the cam ring being connected to the first lens driving ring so that the cam ring rotates around the optical axis with the first lens driving ring when the lens barrel is in the telephoto angle position, the wide angle position, and between the telephoto angle position and the wide angle position, and the cam ring being movable in the optical axis direction with respect to the first lens driving ring; and a disconnection mechanism for disconnecting the cam ring from the first lens driving ring when the lens barrel is retracted from the wide angle position to the collapsed position so that the cam ring can rotate around the optical axis separately from the first lens driving ring when the lens barrel is in the collapsed position.

11. An optical device as in claim 10, wherein:

the cam ring has a protrusion thereon which moves with the cam ring as the cam ring moves along the optical axis, and the disconnection mechanism comprises a protrusion having a slanted surface, wherein the disconnection mechanism disconnects the cam ring from the first lens driving ring by causing the protrusion of the cam ring to interact with the slanted surface of the protrusion of the disconnection mechanism, to change the direction of movement of the protrusion of the cam ring and thereby change the direction of movement of the cam ring.

12. An optical device as in claim 8, wherein the optical device is a camera.

13. An optical device as in claim 9, wherein the optical device is a camera.

14. A drive mechanism for adjusting the spacing between first and second lens groups spaced apart from each other along the optical axis of a lens barrel of an optical device, the lens barrel being movable between a collapsed position inside the body of the optical device, a wide angle position and a telephoto angle position, the drive mechanism comprising:

a member having a cam groove;

a cam ring which rotates around the optical axis of the lens barrel and has a cam groove formed thereon;

a guide member fit into the cam groove of the member and the cam groove of the cam ring and connected to the second lens group, wherein the rotation of the cam ring causes the guide member to move along the cam groove of the member to adjust the spacing between the first and second lens groups, the cam ring moving in a first direction along the optical axis as the lens barrel is moved from the wide angle position to the telephoto angle position, and moving in a second direction, opposite the first direction, as the lens barrel is moved from the wide angle position to the collapsed position, and the drive mechanism further comprises a first lens driving ring which is connected to the first lens group and rotates around the optical axis of the lens barrel to move the first lens group in the optical axis direction, the cam ring being connected to the first lens driving ring so that the cam ring rotates around the optical axis with the first lens driving ring when the lens barrel is in the telephoto angle position, the wide angle position, and between the telephoto angle position and the wide angle position, and the cam ring being movable in the optical axis direction with respect to the first lens driving ring, and a disconnection mechanism for disconnecting the cam ring from the first lens driving ring when the lens barrel is retracted from the wide angle position to the collapsed position so that the cam ring can rotate around the optical axis separately from the first lens driving ring when the lens barrel is in the collapsed position.

15. A drive mechanism as in claim 14, wherein the optical device is a camera.

* * * * *